July 12, 1927.

A. FEINBERG 1,635,267

REFLECTING SIGNAL

Original Filed Sept. 19, 1925

Inventor
Adolf Feinberg
By Louis M. Schmidt.
Atty.

Patented July 12, 1927.

1,635,267

UNITED STATES PATENT OFFICE.

ADOLF FEINBERG, OF HARTFORD, CONNECTICUT.

REFLECTING SIGNAL.

Application filed September 19, 1925, Serial No. 57,476. Renewed November 20, 1926.

My invention relates to improvements in reflecting signals of the form that is used as a traffic signal at the intersection of highways and city streets for assisting in the control of traffic, particularly of automobiles and in which the signal element proper is in the form of a vertically elongated structure that has the periphery of reflective character, as of glass or polished metal, and the object of my improvement is to produce for such signal element a structure in the form of a column in which the reflective periphery is such that when approached, as by the operator of an automobile along one street, movements along a side street will be observable and, also, will be retained in view during a relatively long range of actual movement.

In the accompanying drawing:—

Figure 1:
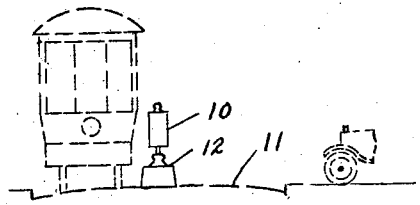
Figure 1 is a side elevation of a reflecting signal embodying my invention and located at an intersection of highways, outlines of the end of a trolley car and part of an automobile being indicated by broken lines.
Figure 2:
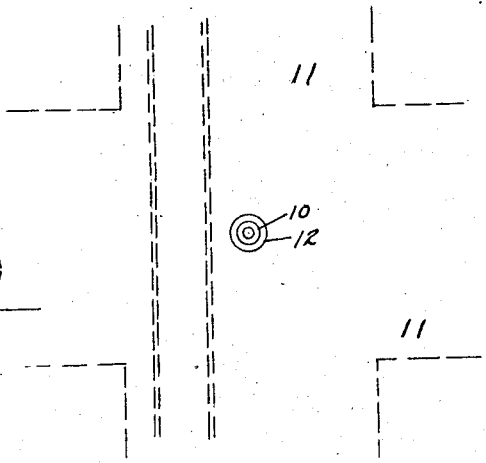
Figure 2 is a plan view of the same, the boundaries of the highways and the lines of the trolley car tracks being indicated by broken lines.
Figure 3:
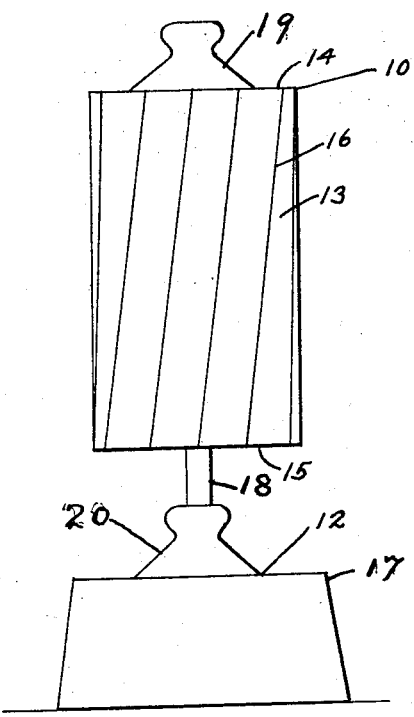
Figure 3 is a side elevation of the reflecting signal.
Figure 4:
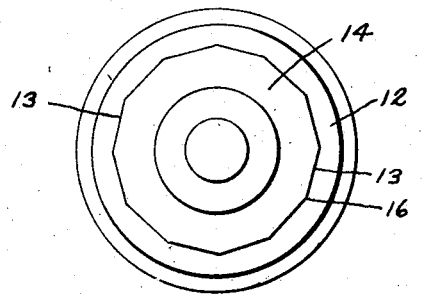
Figure 4 is a plan view on an enlarged scale of the same.

My improved reflecting signal comprises a vertically enlongated column 10 that is set up at the intersection of highways or streets 11 so as to be visible to the operator in an automobile that is approaching the same from one of the streets and the periphery thereof is of reflective character so that movements, as of another automobile on one of the laterally directed streets will be observable by such an operator.

The column 10 may be mounted on a suitable pedestal 12 so that the eyes of the operator would be at an elevation that corresponds to about the middle of the height of the column 10, the precise arrangement depending upon the details as to size and the like.

In the present instance the column 10 is about three feet high and the diameter of which detail further explanation will be given, would be about one-half as great.

The cross-section of the column shows a polygonal figure and the diameter of one and one-half feet would be substantially correct for the smaller diameter, across between opposite flat sides 13, said flat sides 13 corresponding to facets that extend continuously longitudinally from end to end or top 14 to bottom 15.

The corners 16 at the junctions of adjacent flat sides or facets 13 appear as projections on the periphery or as ridges and the lines that they follow are helical paths. Thus each facet 13 is developed by a short straight horizontal line, the length thereof being that along the horizontal and between adjacent corners 16, said developing short line being traced along between two helical lines as represented by the corresponding corners 16.

The particular figure for the cross-section or the top 14 or bottom 15 is an equilateral twelve-sided polygon. Also, the extent of movement of the spiral or helix from top to bottom is about one-sixth of a circle or sixty degrees.

The facets 13 operate as the active reflecting faces, the material being glass, coated to operate as a mirror, or plated and polished metal.

In use, said facets are selectively used according to the relative location of the observer and the approaching car and the particular result attained is a reduced image that is retained within the field of vision throughout a relatively long range of relative movement.

The pedestal 12 comprises a base 17 from which a rod 18 projects upwardly and enters within the interior of the column 10 and is connected thereto in any proper manner.

The column 10 is surmounted by a cap 19 of relatively appreciable size; that has a periphery of reflective character; that may be made of glass and of red color, and that may be either smooth or corrugated as to said periphery. Said cap 19 is accordingly adapted to operate as a fixed warning for an approaching operator after the manner of similar devices that are in common use.

A generally similar cap 20 is shown as surmounting the base 17 and enclosing the adjacent lower portion of the rod 18, and which may be made in one piece with an opening for the rod or may be made in two parts, each with a semi-circular recess for the rod.

I claim as my invention:—

A reflecting signal in the form of a column of vertically elongated form and having a periphery of reflective character, said column having the cross-section from top to bottom of equilateral polygonal form, involving a plurality of facets that extend from said top to said bottom, and the lateral edges of said facets in extending from said top to said bottom following along helical lines.

ADOLF FEINBERG.